United States Patent
Van Rees et al.

(10) Patent No.: US 7,878,323 B2
(45) Date of Patent: Feb. 1, 2011

(54) CONVEYOR

(75) Inventors: Michael Van Rees, Rhoon (NL);
Cornelis Hendrik Mijndert Menke,
The Hague (NL); Gijsbertus Johannes Verduijn, Terheijden (NL)

(73) Assignee: Rexnord Flattop Europe B.V.,
Gravenzande (NL)

( * ) Notice: Subject to any disclaimer, the term of this patent is extended or adjusted under 35 U.S.C. 154(b) by 0 days.

(21) Appl. No.: 12/089,673

(22) PCT Filed: Oct. 10, 2006

(86) PCT No.: PCT/NL2006/000510

§ 371 (c)(1),
(2), (4) Date: Jul. 17, 2008

(87) PCT Pub. No.: WO2007/043865

PCT Pub. Date: Apr. 19, 2007

(65) Prior Publication Data

US 2009/0145731 A1 Jun. 11, 2009

(30) Foreign Application Priority Data

Oct. 10, 2005 (NL) ................................ 1030155

(51) Int. Cl.
*B65G 17/08* (2006.01)
(52) U.S. Cl. .................. 198/850; 198/851; 198/852; 198/853; 198/841; 198/845

(58) Field of Classification Search ......... 198/850–853, 198/841, 845; 99/386, 388, 399
See application file for complete search history.

(56) References Cited

U.S. PATENT DOCUMENTS

| 4,765,454 | A |   | 8/1988  | Hodlewsky et al.             |
|-----------|---|---|---------|------------------------------|
| 4,951,457 | A | * | 8/1990  | Deal .................... 59/78 |
| 5,083,659 | A |   | 1/1992  | Bode et al.                  |
| 5,303,818 | A |   | 4/1994  | Gruettner et al.             |
| 5,597,062 | A | * | 1/1997  | Biwer .................. 198/600 |
| 6,296,110 | B1 | * | 10/2001 | van Zijderveld et al. .... 198/635 |

(Continued)

FOREIGN PATENT DOCUMENTS

EP 0 258 555 4/1993

(Continued)

OTHER PUBLICATIONS

International Search Report corresponding to PCT/NL2006/000510 under date of mailing of Feb. 1, 2007.

*Primary Examiner*—Douglas A Hess
(74) *Attorney, Agent, or Firm*—Quarles & Brady LLP

(57) ABSTRACT

A conveyor for conveying products along a conveying track with varying temperature, comprising a first axle provided with first divert wheels and a second axle provided with second divert wheels and a plurality of modular, endless conveyor mats built up from plastic modules, travelling in side-by-side parallel relation in a conveying direction around the first and second divert wheels.

20 Claims, 2 Drawing Sheets

U.S. PATENT DOCUMENTS

| | | | |
|---|---|---|---|
| 6,328,985 B1 * | 12/2001 | Sanduja et al. | 424/404 |
| 6,364,095 B1 * | 4/2002 | Layne et al. | 198/852 |
| 6,471,048 B1 * | 10/2002 | Thompson et al. | 198/853 |
| 6,471,049 B1 * | 10/2002 | van Esch et al. | 198/853 |
| 6,595,117 B1 * | 7/2003 | Jones et al. | 99/386 |
| 6,648,129 B2 * | 11/2003 | Sedlacek | 198/850 |
| 6,793,069 B2 * | 9/2004 | Guldenfels | 198/853 |
| 6,964,333 B2 * | 11/2005 | Ledingham | 198/841 |
| 7,307,243 B2 * | 12/2007 | Farkas et al. | 219/388 |
| 7,314,132 B2 * | 1/2008 | Layne et al. | 198/850 |
| RE40,248 E * | 4/2008 | Damkjaer et al. | 198/853 |
| 7,554,057 B2 * | 6/2009 | Monny Dimouamoua | 219/388 |
| 7,559,422 B2 * | 7/2009 | Layne et al. | 198/850 |

FOREIGN PATENT DOCUMENTS

EP           0 538 674           4/1993

* cited by examiner

CONVEYOR

The invention relates to a conveyor for conveying products along a conveying track with varying temperature, comprising a first axle provided with first divert wheels and a second axle provided with second divert wheels, and a modular, endless conveyor mat built up with plastic modules and travelling between the first and second divert wheels in a conveying direction.

An example of such a conveyor may be a tunnel oven or, for instance, a tunnel pasteurizer, or a tunnel cooler, with which the conveying mat passes through a housing. In the housing, a number of zones is realized in which the temperature of the products to be conveyed can be influenced with heat exchanging medium. An example is a beer bottle to be pasteurized which, with the aid of the modular transport mat, is passed through a number of zones within the housing, in which hot water is sprayed on the bottle with, each time, per zone, a different temperature, for instance 20-40-60-80-60-40° C.

Such a conveyor can, for instance, be 6.5 meters wide and up to 40 meters long. Such a conveyor conveys the products at a velocity of approximately 0.5-1 m/min and may have a capacity of approximately 70,000 beer bottles per hour. In the water zones, per $m^2$ of track surface, approximately 25 $m^3$ of water is sprayed per hour on the beer bottles. For a more efficient use of the water, two conveyors can be arranged within one housing, one above the other.

What is advantageous of the conveyor mats built up with plastic modules is that they are relatively lightweight and relatively inexpensive.

However, it has appeared from practice that, during use, the modular conveyor mat of the conveyor sometimes becomes damaged or even breaks. In case of breakage, great damage to the conveyor and a housing that may surround it may occur. In case of breakage of the mat, the products conveyed at that moment by the conveyor are for the most part lost, while large consequential losses can occur in that the production can come to a standstill for a longer period of time until the conveyor has been repaired.

The object of the invention is a conveyor of the type mentioned in the opening paragraph, with which the risk of damage and/or breakage of the modular conveyor mat can be reduced. To that end, the invention provides a conveyor for conveying products along a conveying track with varying temperature. The conveyor includes a first axle provided with first divert wheels and a second axle provided with second divert wheels. A plurality of modular, endless conveyor mats built up from plastic modules travel separately in side-by-side parallel relation in a conveying direction around the first and second divert wheels.

Through provision of a conveyor with a plurality of conveyor mats travelling in side-by-side parallel relation, i.e., at least three conveyor mats, the wide mat can be divided into a number of parallel tracks that can move relative to each other. Bending and torsion in the first or second axle can thus be absorbed considerably better by the mat, so that the risk of damage or breakage can be considerably reduced.

In an advantageous manner, at least one of the mats comprises, transverse to the conveying direction, several modules placed side by side. It is preferred that modules successive in conveying direction are then coupled by hinge pins extending transversely to the conveying direction over, at most, the width of the conveyor mat. Here, the hinge pins are, at most, as wide as one mat track, so that the mat tracks are not mutually connected via joint hinge pins.

It is preferred that the width of the conveyor mats is between approximately 300 mm and approximately 500 mm.

When using such relatively narrow mat tracks, assembly of the conveyor can be considerably simplified. The number of parallel mat tracks can, for instance, be at least 5, with wide pasteurizer even at least 7.

What is achieved through the provision of an intermediate space of less than approximately 15 mm, preferably less than 5 mm, between adjacent conveyor mats is, that the conveyor mats can expand transversely to the conveying direction in case of temperature increase. Ideally, the longitudinal edges of the conveyor mats abut against each other without pressure. With such a relatively small intermediate space, the risk of glass or dirt entering is relatively small, while the intermediate space does not upset the stability of a product placed completely or partly over the intermediate space.

When the conveyor mats cooperate each at their underside with at least one longitudinal guide extending in conveying direction between the divert wheels, the intermediate space between the mat tracks can be maintained relatively simply.

Preferably, the longitudinal guides are fixed, transversely to the conveying direction with an intermediate space, to crossbeams spaced apart in conveying direction.

It is preferred here that the cross beams are then arranged, transversely to the conveying direction, so as to be at least partly slideable so they can expand freely. As a result, the cross beams can follow any length change of the mat tracks transversely to the conveying direction as a result of temperature change. Consequently, when the cross beam is manufactured from a material with substantially the same coefficient of expansion as the plastic mat material, the intermediate space between the mat tracks can be kept substantially constant over the conveying path.

Preferably, the cross beam comprises a plastic section which is arranged so as to be slideable on a cross bar, and which is fixed transversely to the conveying direction adjacent the middle on the cross bar.

Further advantageous embodiments of the invention are represented in the subclaims. The invention will be further elucidated on the basis of an exemplary embodiment which is represented in a drawing.

In the drawing.

The Figures are only a schematic representation of a preferred embodiment of the invention which is given here by way of non-limitative exemplary embodiment. In the Figures, identical or corresponding parts are represented with the same reference numerals.

Figure 1:
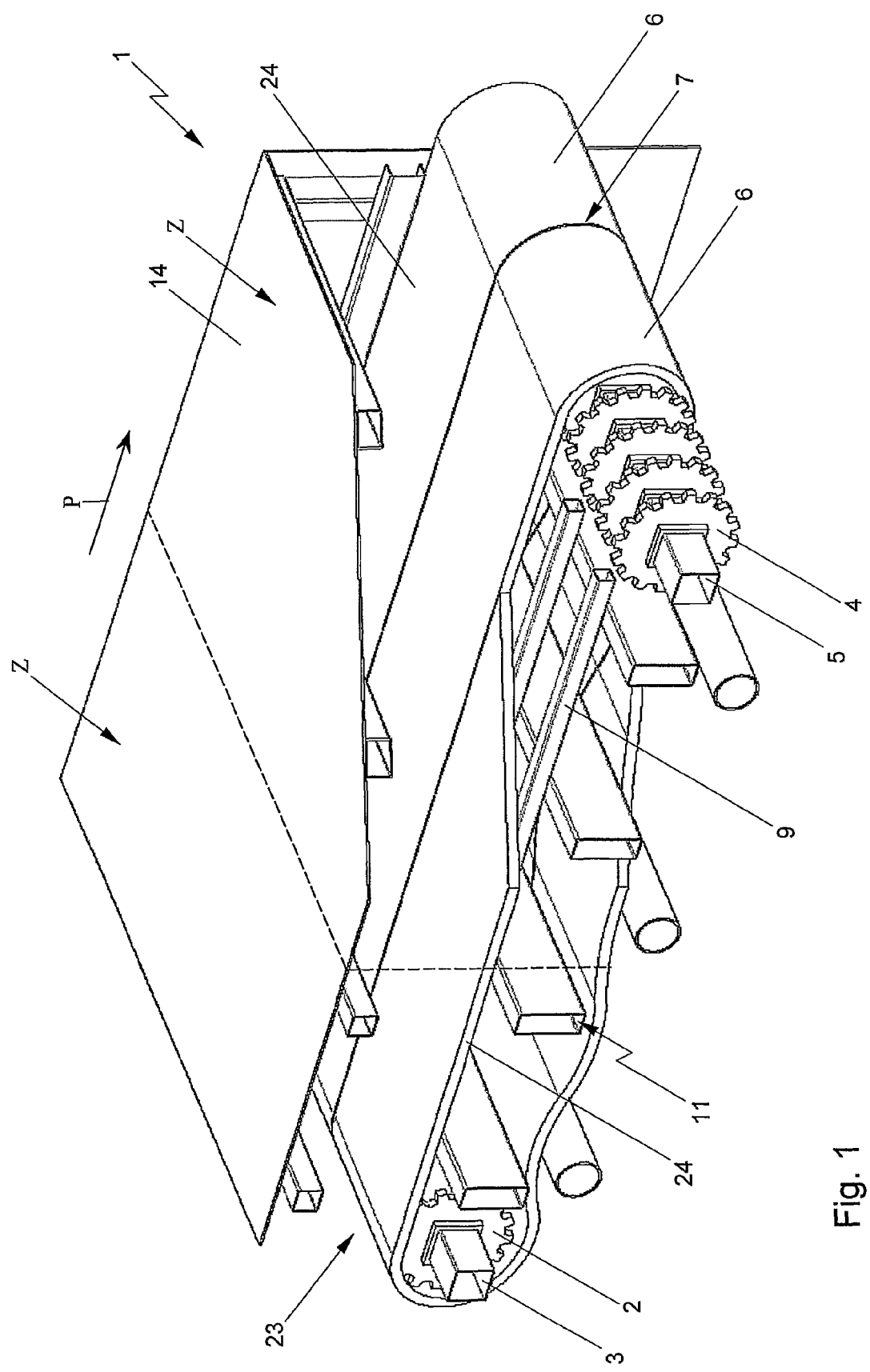
FIG. 1 shows a schematic, perspective view of a conveyor.

FIG. 1 shows a conveyor 1 for conveying products along a conveying track with varying temperature. The conveyor 1 comprises a first axle 3 provided with divert wheels 2 and a second axle 5 provided with second divert wheels 4. In a conveying direction indicated with an arrow P, a plurality of endless conveyor mats 6 travels in side-by-side parallel relation around the first and second divert wheels 2, 4. Together, the conveyor mats define a conveying surface that is clear of obstacles. As will be further elucidated hereinafter, the conveyor mats 6 are of modular design, with plastic mat modules 15. Here, the width of the modular mats 6 is approximately 400 mm. Between adjacent conveyor mats 6 there is an intermediate space 7 of approximately 2 mm. For the sake of convenience, in the Figure, the length of the conveyor is shortened. For this reason too, only three mat tracks are represented. In reality, the length of the conveyor 1 would be, for instance, 40 m with 13 mat tracks, each having a width of 500 mm.

Figure 2:
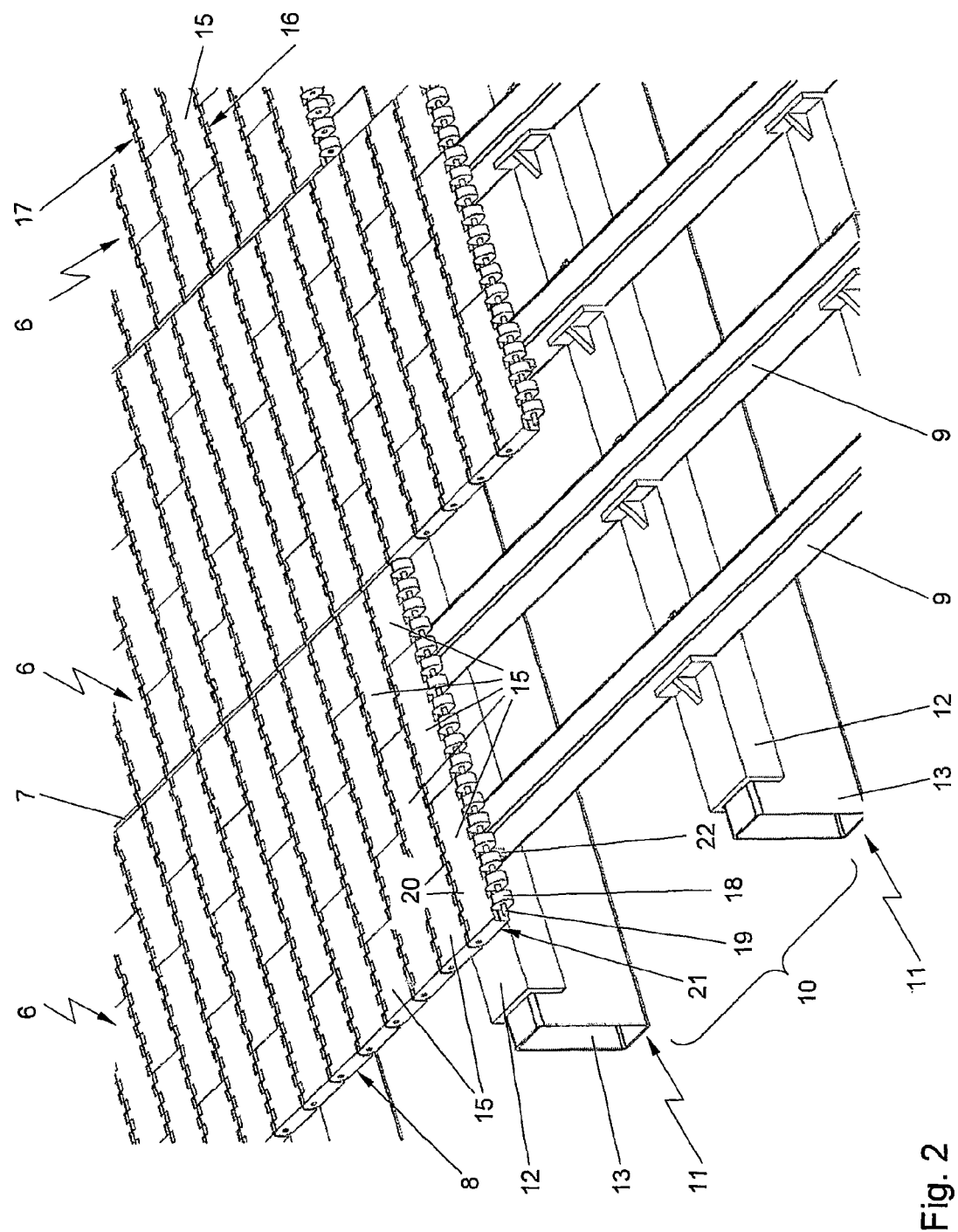
FIG. 2 shows a detail of the conveyor of FIG. 1.

In FIG. 2, the conveyor mats 6 are shown in detail, while it is clearly visible that each conveyor mat 6 cooperates at its underside 8 with at least one longitudinal guide extending in the conveying direction P between the divert wheels 2 and 4. In the exemplary embodiment shown in FIG. 2, each conveyor mat 6 cooperates at its underside 8 with two longitudinal guides 9.

The longitudinal guides 9 are fixed transversely to the conveying direction P, with an intermediate space 10, to cross beams 11 spaced apart in the conveying direction P. The cross beams 11 can freely expand transversely to the conveying direction P. Here, the cross beams 11 are manufactured from the same material as the plastic material of the modules 15 of the conveyor mats 6. The cross beams 11 comprise a section 12 from plastic material, which is arranged so as to be slideable on a cross bar 13 extending transversely to the conveying direction P, and which is fixed, adjacent the middle, to the cross bar 13. In this manner, the section 12 can expand from the middle, symmetrically sideways.

In FIG. 1, the conveyor mats 6 are shown, while they pass through a housing 14. Here, the housing 14 forms a tunnel. In the tunnel, the conveyor 1 traverses a number of temperature zones Z in which the temperature of the products can be influenced with water as heat exchanging medium. Here, the temperature in the zones Z proceeds in steps according to the pattern 40-60-80-60-40° C. For the sake of convenience, in the Figure, only two zones are represented.

Referring to FIG. 2, the conveyor mats 6 each comprise a number of plastic modules 15, successive in the conveying direction P and travelling in the conveying direction P. Here, in the conveying mats 6, several modules are situated side by side transversely to the conveying direction P. The modules 15 are provided, each at their front side 16 and rear side 17, with a plurality of hinge loops 18. The hinge loops 18 of the modules 15 successive in the conveying direction P cooperate and are coupled with the aid of hinge pins 19. The hinge pins 19 extend transversely to the conveying direction P over, at most, the width of the mat 6. Here, the conveying mats 6 form separate units, and are not coupled via joint hinge pins. The hinge pins can be manufactured from plastic, but can also be manufactured from a different sort of the material, such as steel. If desired, the conveyor mats 6 can be provided with reinforcing plates, integrated or not integrated in the modules 15, from a different material than plastic, for instance steel. Here, such reinforcing plates can connect successive hinge pins in conveying direction.

Referring to FIG. 2, a conveyor mat 6 is only 1 module 15 wide transversely to the conveyor direction P. Naturally, per mat, several modules 15 can be situated side by side. In the conveyor mat 6, a number of guiding modules 20 are included, which are provided at the underside 21 with two guiding elements 22 for cooperation with a longitudinal guide 9. Naturally, it is also possible to design at least a number of the conveying mats 6 without guiding elements 22. In such a case, the longitudinal guides 9 of the conveying track 23 serve only as wear strips that support the conveying mats 6.

Referring to FIG. 1, the conveyor 1 is provided with a conveyor track 23 for supporting upper parts 24 of the conveyor mats 6 extending between the divert wheels 2, 4.

The longitudinal guides and/or wear strips of the conveying track 23 may, optionally, be provided with rollers for cooperation with the underside of the upper part 24 of a conveying mat 6, to facilitate movement in conveying direction. It is noted that such rollers, which are preferably of cylindrical design, having a rotation axis located substantially transversely to the conveying direction, and which are preferably spaced apart with an intermediate space in the conveying direction in an upper surface of the wear strip or longitudinal guide, can also be advantageously utilized per se in a conventional conveyor track for a modular conveyor mat.

It will be clear that the invention is not limited to the exemplary embodiment represented here. It will be clear to the skilled person that many variants are possible within the scope of the invention as set forth in the following claims.

The invention claimed is:

1. A conveyor for conveying products along a conveying track, said conveyor comprising;
   a tunnel housing having a plurality of temperature zones;
   a first axle provided with first divert wheels;
   a second axle provided with second divert wheels;
   a first modular, endless conveyor mats having a first width, said first conveyor mat being built up from first plastic modules joined by first hinge pins having a length no greater than said first width;
   a second modular, endless conveyor mat having a second width, said second conveyor mat being built up from second plastic modules joined by second hinge pins having a length no greater than said second width, said first and second modular, endless conveyor mats traveling separately in side-by-side parallel relation in a conveying direction along the track through said temperature zones of said tunnel housing and around the first and second divert wheels; and
   a heat exchanging medium influencing the temperature of the products conveyed on said plurality of conveyor mats in at least one of said temperature zones in said tunnel housing.

2. A conveyor according to claim 1, wherein the first and second widths of the modular mats is between approximately 300 mm and approximately 500 mm.

3. A conveyor according to claim 1, wherein between adjacent conveyor mats, an intermediate space of less than approximately 15 mm is present, preferably an intermediate space of less than 5 mm.

4. A conveyor according to claim 1, wherein the conveyor mats cooperate each at their underside with at least one longitudinal guide extending between the divert wheels in conveying direction.

5. A conveyor according to claim 4, wherein the longitudinal guides are fixed, transversely to the conveying direction, with an intermediate space, to cross beams spaced apart in conveying direction.

6. A conveyor according to claim 5, wherein the cross beams are arranged transversely to the conveying direction, so as to be at least partly slideable, so they can expand freely.

7. A conveyor according to claim 5, wherein the cross beams are manufactured from a material with substantially the same coefficient of expansion as the plastic material of the conveying mats.

8. A conveyor according to claim 5, wherein the cross beam comprises a section arranged so as to be slideable on a cross bar extending transversely to the conveying direction.

9. A conveyor according to claim 1, wherein the conveyor mats pass through a housing.

10. A conveyor according to claim 1, wherein the heat exchanging medium is a liquid.

11. A conveyor according to claim 1, wherein the conveyor mats each comprise a number of plastic modules, successive in conveying direction and traveling transversely to the conveying direction, which are each provided, at their front and rear sides, with hinge loops, while the hinge loops of modules successive in conveying direction cooperate and are coupled with the aid of hinge pins extending transversely to the conveying direction over, at most, the width of the mat.

12. A conveyor according to claim 1, wherein the modules are each provided at the front and rear side with a plurality of hinge loops.

13. A conveyor according to claim 1, wherein, in at least one conveyor mat, transversely to the conveying direction, several modules are located side by side.

14. A conveyor according to claim 1, wherein, in the conveyor mat, a number of guiding modules are included which are provided at the underside with one or more guiding elements for cooperation with a longitudinal guide.

15. A conveyor according to claim 1, wherein a conveying track is provided for supporting upper parts of the conveyor mats extending between the divert wheels.

16. A conveyor according to claim 1, wherein the plurality of conveyor mats numbers at least 5, and in particular at least 7.

17. A conveyor for conveying products along a conveying track, said conveyor comprising;
- a tunnel housing having a plurality of temperature zones;
- a first conveyor mat built up from first plastic modules traveling in a conveying direction through said temperature zones of said tunnel housing;
- a first guide extending in the conveying direction cooperating with an underside of the first conveyor mat;
- a second conveyor mat built up from second plastic modules and traveling separate from said first conveyor mat in side-by-side parallel relation with said first conveyor mat in the conveying direction through said temperature zones of said tunnel housing;
- a second guide extending in the conveying direction cooperating with an underside of the second conveyor mat;
- at least one cross beam extending substantially transverse to the conveying direction supporting said first and second guides, said cross beam including a cross bar extending substantially transverse to the conveying direction and a section slidable on the cross bar extending substantially transverse to the conveying direction supporting the first and second guides.

18. The conveyor as in claim 17, including a first axle provided with first divert wheels and a second axle provided with second divert wheels, wherein said first conveyor mat and said second conveyor mat travel around the first and second divert wheels.

19. The conveyor as in claim 17, including a heat exchanging medium influencing the temperature of the products conveyed on said first and second conveyor mats in at least one of said temperature zones in said tunnel housing.

20. The conveyor as in claim 17, in which the first conveyor mat has a first width and is built up from the first plastic modules joined by first hinge pins having a length no greater than the first width, and the second conveyor mat has a second width and is built up from the second plastic modules joined by second hinge pins having a length no greater than said second width.

* * * * *

UNITED STATES PATENT AND TRADEMARK OFFICE
CERTIFICATE OF CORRECTION

Page 1 of 1

| | |
|---|---|
| PATENT NO. | : 7,878,323 B2 |
| APPLICATION NO. | : 12/089673 |
| DATED | : February 1, 2011 |
| INVENTOR(S) | : Michael Van Rees et al. |

It is certified that error appears in the above-identified patent and that said Letters Patent is hereby corrected as shown below:

Col. 4, claim 1, line 14, "mats" should be changed to -- mat --

Signed and Sealed this
Fifth Day of April, 2011

David J. Kappos
*Director of the United States Patent and Trademark Office*